June 10, 1930.  F. J. STUCKERT, JR  1,763,018
AUTOMOBILE SWITCH
Filed May 13, 1927
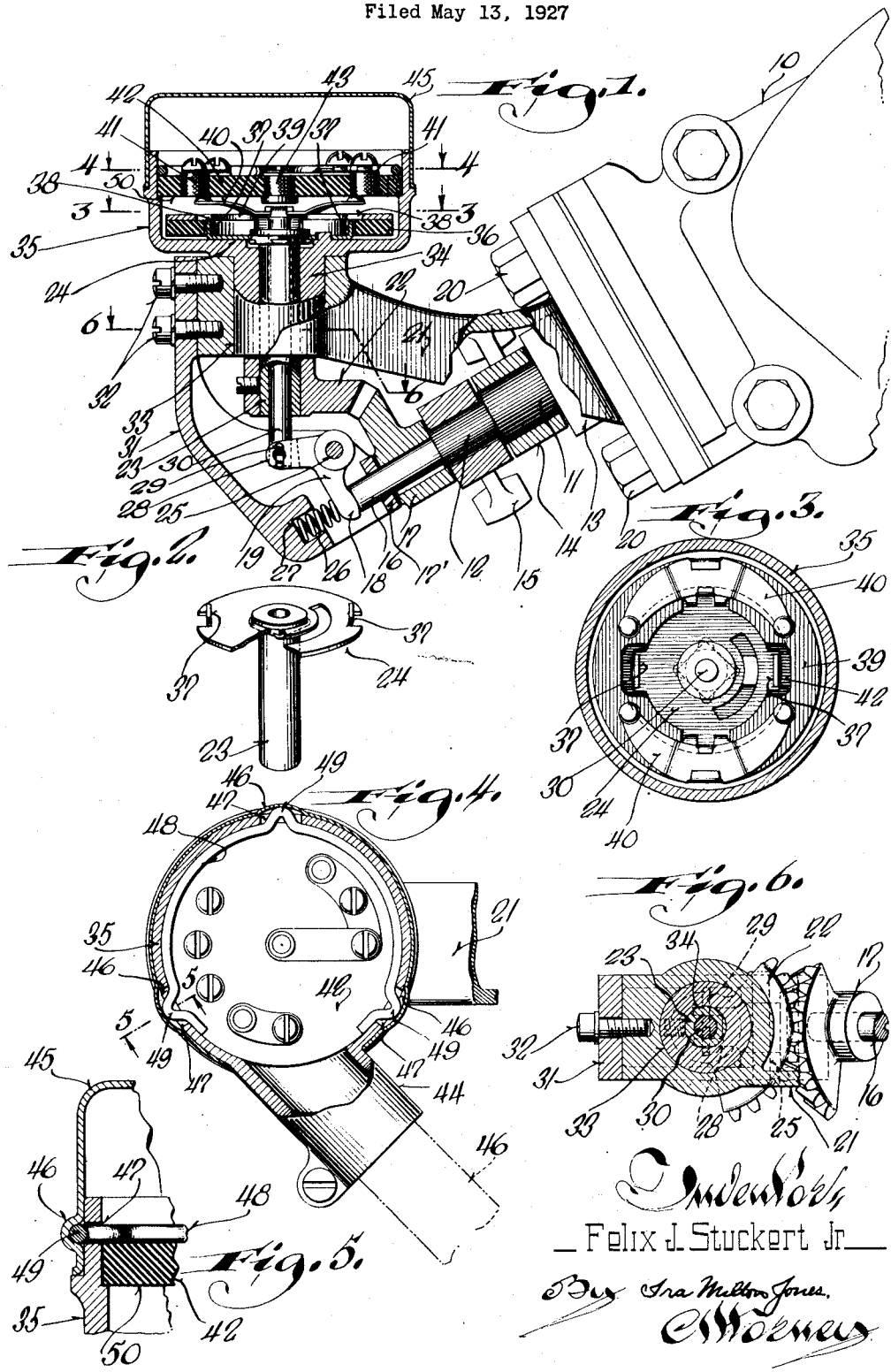

Patented June 10, 1930

1,763,018

UNITED STATES PATENT OFFICE

FELIX J. STUCKERT, JR., OF MILWAUKEE, WISCONSIN, ASSIGNOR TO BRIGGS & STRATTON CORPORATION, OF MILWAUKEE, WISCONSIN, A CORPORATION OF WISCONSIN

AUTOMOBILE SWITCH

Application filed May 13, 1927. Serial No. 191,073.

This invention relates to certain new and useful improvements in automobile switches and refers to switch constructions in which the switch mechanism of an automobile is mounted adjacent the base of the steering gear column and is actuated from a convenient point adjacent the steering wheel, the drive for the switch mechanism being entirely mechanical to eliminate running wires through or along the steering gear column.

It is an object of this invention to provide a simplified switch actuating means for controlling a switch device mounted at the base of a vehicle steering gear column by an actuating member located adjacent the upper or outer end of the steering gear, preferably above the steering wheel.

A further object of this invention resides in the provision of a single operating rod within the steering gear column having an actuating member on its upper end and a segmental gear slidably splined on its lower end and additional means connected therewith whereby rotation of said member actuates the switch mechanism through the segmental gear, and shifting thereof actuates a contact for a horn circuit or the like.

And a still further object of this invention resides in the provision of an improved and simplified means for readily removably securing the switch cover and switch terminal head in place.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawing, I have illustrated one complete example of the physical embodiment of my invention constructed according to the best mode I have so far devised for the practical application of the principles thereof, and in which:

Figure 1 is a side elevational view of the lower portion of the steering gear of a vehicle equipped with my improved switch device and operating mechanism, the switch device and operating mechanism being partly in section and partly in side elevation;

Figure 2 is a perspective view, with parts broken away of the switch device driver member;

Figure 3 is a transverse, sectional view taken through Figure 1 on the plane of the line 3—3;

Figure 4 is a view, partly in section and partly in elevation, taken transversely through Figure 1 on the plane of the line 4—4;

Figure 5 is a fragmentary, sectional view taken through Figure 4 on the plane of the line 5—5 and illustrating the improved means for securing the switch parts in place, and Figure 6 is a detailed view, partly in section and partly in elevation, taken through Figure 1 on the plane of the line 6—6.

Referring now more particularly to the accompanying drawing, in which like numerals designate like parts throughout the several views, 10 designates the gear housing or casing of a steering gear adapted to be suitably mounted from the adjacent vehicle chassis frame side beam, not shown, in a conventional manner. The gear housing, which is fragmentarily shown, is of conventional construction, and for more detailed description of one type thereof, reference may be made to the copending application of Edward N. Jacobi aforementioned. As described in said copending application, control tubes 11 and 12 are mounted within the steering gear column with their lower ends projecting beyond the base 13 of the gear casing, the innermost tube 12 having its end projected beyond the adjacent end of the tube 11 so that spark and gas control levers 14 and 15 may be fixed thereto. The levers 14 and 15 are actuated by levers, not shown, mounted adjacent the steering wheel, not shown, and are connected with the gas and spark controls, not shown, of the vehicle.

Slidable and rotatable within the innermost tube of the steering column is a rod or tube 16, the upper end of which is connected with a combination horn button and switch actuating lever, not shown, similar to the one illustrated and described in said copending application. The lower end of the rod 16 extends beyond the lower end of the tube 12 and is longitudinally splined in a segmental gear 17 with its extreme lower end engageable with the arm 18 of a bell crank lever 19, to be later described.

Secured to the lower end of the gear casing 10 by the bolts 20 securing the end plate thereto, is a combination bracket member and housing 21 into which the tubes 11, 12 and 16 project and which covers the segmental gear 17 and a second segmental gear 22 with which the same meshes and which is secured to the tubular shank 23 of a switch driver member 24, to be later described. The bell crank 19 is pivoted at its apex within the housing 21 with its arm 18 maintained in the path of the end of the tube 16 by an expansion spring 26 mounted in a pocket 27 in the casing and operating against the arm 18. The other arm 28 of the bell crank is pivotally connected at 29 with a contact rod or stem 30 for actuating a horn or other contact, in the manner later described.

The casing 21 is preferably formed in two parts having an end member 31 secured in place by cap screws or other means 32 so that the same may be readily removed to permit access to the interior of the housing 21 and the hub of the gear 17 is held against shifting by the end of the tube 12 and a bored stop 17' through which the rod 16 extends. The outer end of the bracket member proper is vertically bored at 33 to mount the central boss 34 of a switch receptacle 35 in which the stem or shaft 23 of the driver member 24 located within the receptacle is rotatably mounted.

The switch mechanism may be substantially the construction illustrated in said copending application having the driver member 24 and a fibre disk 36 drivingly connected therewith by upstruck tongues 37 formed on the driver member and engaging in recesses 38 in the disk, and a contact support 39 having spring contact fingers 40 adapted to engage the terminals 41 of a terminal carrying head 42. The terminal carrying head 42 has a central terminal 43 in register with the bore of the driver member stem which is engageable by the upper end of the contact rod 30 when the same is actuated by the downward movement of the rod 16, in the manner later described.

As described at length in said copending application, a combination horn button and switch actuating lever is connected with the upper end of the rod 16 so that its depression closes the circuit including the terminal 43, moving the arm 18 of the bell crank lever against its spring and moving the stem 30 into the receptacle 35 engaging the terminal 43 to close the circuit in which the same is incorporated, and release of the pressure on the rod permits its return by its spring means, not shown, the spring 26 retracting the rod 30 from the terminal 43. Likewise, rotation of the rod 16 imparts rotary movement to the driver member 24 through the gears 17 and 22 engaging the contact fingers 40 with respective terminals of the terminal carrying head to close the various circuits connected therewith.

The receptacle 35 is preferably cast and has a tubular clamp 44 extended therefrom and communicating with the interior of a cover or cap 45 enclosing the switch mechanism, the cover or cap being slotted to accommodate the clamp 44 in which is secured one end of a cable 46 carrying the various wires connected with the terminals 41 and 43. The cover 45 has notched recesses 46 formed therein adjacent its peripheral edge in register with openings 47 in the side wall of the receptacle 35 at a point substantially flush with the top face of the terminal carrying head 42, and a split, expanding ring 48 having projections 49 spaced apart to correspond with the spaces between the slots 47 is adapted to be compressed within the diameter of the receptacle 35 with its projections extended through the slots 47 into the recesses 46 of the cover. In this manner, a single means secures the cover 45 in place and likewise the terminal carrying head within the receptacle. As best shown in Figures 1 and 5, the portion of the receptacle in which the terminal carrying head is fitted is counterbored to provide a shoulder 50 between which and the ring 48 the terminal carrying head is confined.

What I claim as my invention is:

1. The combination with the steering gear of an automotive vehicle and its switch mechanism of means for mounting the switch mechanism in an upright position juxtapose the lower end of the steering gear, the switch mechanism including terminals and a plurality of contactors operable to engage and disengage the terminals, one of said contactors being slidable and the other rotatable into and out of engagement with their respective terminals, means for operating one contactor including a segmental gear, and means for operating the other contactor including a pivoted lever.

2. The combination with the steering gear of an automotive vehicle and its switch mechanism of means for mounting the switch mechanism in an upright position juxtapose the lower end of the steering gear, the switch mechanism including a casing, terminals and a plurality of contactors operable to engage and disengage the terminals within the casing, one of said contactors being slidable and the other rotatable into and out of engagement with the terminals, means for operating one contactor including a segmental gear, and means for operating the other contactor including a lever.

3. The combination with the steering gear of an automotive vehicle and its switch mechanism of means for mounting the switch mechanism in an upright position juxtapose the lower end of the steering gear, the switch mechanism including terminals and a plurality of contactors operable to engage and disengage the terminals, one of said contactors being slidable and the other rotatable into and out of engagement with the terminals, means for operating one contactor including segmental gears, means for operating the other contactor including a pivoted lever, and a single actuating member for independently rotating the segmental gears and moving the lever on its pivot to actuate the contactors.

4. The combination with the steering gear of an automotive vehicle and its switch mechanism of means for mounting the switch mechanism in an upright position juxtapose the lower end of the steering gear, the switch mechanism including terminals and a plurality of contactors operable to engage and disengage the terminals, one of said contactors being slidable and the other rotatable into and out of engagement with the terminals, means for operating one contactor including segmental gears, means for operating the other contactor including a pivoted lever, and a single actuating member for rotating the segmental gears and moving the lever on its pivot to actuate the contactors.

5. The combination with the steering gear of a motor vehicle and its switch mechanism including a terminal carrying head, terminals carried by the head and contactors independently operable to engage the terminals, of means mounting the switch mechanism from the steering gear with the axes of the steering gear and switch mechanism forming an acute angle, an actuating member slidably and rotatably extended through the steering gear, means connecting the actuating member with one contactor of the switch mechanism whereby rotation of the actuating member is transmitted to said contactor in a like movement, and means connecting the other contactor with the actuating member whereby longitudinal movement of the actuating member is transmitted to the other contactor.

6. The combination with the steering gear of a motor vehicle and its switch mechanism including a terminal carrying head, terminals carried by the head and contactors independently operable to engage the terminals, of means mounting the switch mechanism from the steering gear, an actuating member extended through the steering gear and slidable and rotatable therein, a tubular shank extended from one contactor and terminating juxtapose the adjacent end of the actuating member, a shank extended from the other contactor through the tubular shank of the first contactor and extended therebeyond, and operating connections between the contactor shanks and the actuating member whereby rotation of the actuating member is likewise transmitted to one contactor and longitudinal shifting of the actuating member is likewise transmitted to the other contactor.

7. The combination with the steering gear of a motor vehicle and its switch mechanism including a terminal carrying head, terminals carried by the head and contactors independently operable to engage the terminals, of means mounting the switch mechanism from the steering gear with its axis forming an acute angle with that of the steering gear, an actuating member extended through the steering gear and slidable and rotatable therein, a tubular shank extended from one contactor and terminating juxtapose the adjacent end of the actuating member, a shank extended from the other contactor through the tubular shank of the first contactor and extended therebeyond, a gear member having a slidable spline connection with the actuating member, means carried by one contactor shank and meshing with said gear member whereby rotation of the actuating member rotates the contactor connected therewith, and a lever pivoted intermediate the actuating member and said other contactor shank for imparting longitudinal movement to said other contactor when the actuating member is longitudinally shifted into the steering gear.

8. The combination with the steering gear of an automotive vehicle, of a switch mechanism, means mounting the switch mechanism from the steering gear in an upright position whereby its axis forms an acute angle with that of the steering gear, the switch mechanism including an enclosing casing, stationary terminals within the casing and contactors independently operable to engage and disengage the terminals, one of the contactors having a rotary movement within the enclosing casing and the other having an axial sliding movement therein, means connected with the contactors and extending outside of the enclosing casing, an actuator within the steering gear, and means connecting the actuator with said means extending outside of the enclosing casing whereby the contactors may be independently operated by the actuator.

In testimony whereof, I hereunto affix my signature.

FELIX J. STUCKERT, Jr.